US005698807A

United States Patent [19]

Massie et al.

[11] Patent Number: 5,698,807

[45] **Date of Patent: *Dec. 16, 1997**

[54] DIGITAL SAMPLING INSTRUMENT

[75] Inventors: Dana C. Massie, Capitola; David P. Rossum, Aptos, both of Calif.

[73] Assignee: Creative Technology Ltd., Singapore, Singapore

[ * ] Notice: The term of this patent shall not extend beyond the expiration date of Pat. No. 5,248,845.

[21] Appl. No.: 611,014

[22] Filed: Mar. 5, 1996

Related U.S. Application Data

[60] Continuation of Ser. No. 77,424, Jun. 15, 1993, abandoned, which is a division of Ser. No. 854,554, Mar. 20, 1992, Pat. No. 5,248,845.

[51] Int. Cl.$^6$ .............................. G01H 1/12; G10L 9/04; G10L 9/14

[52] U.S. Cl. ...................... 84/661; 84/DIG. 9; 395/2.71; 395/2.73; 395/2.77; 364/724.01; 381/61

[58] Field of Search ............................ 84/622–625, 627, 84/633, 661, 663, 665, DIG. 9, 603–607; 381/51, 61, 98–109; 364/724.01–727; 128/746; 395/2.67–2.78

[56] References Cited

U.S. PATENT DOCUMENTS

| | | | |
|---|---|---|---|
| 4,321,427 | 3/1982 | Singh | 128/746 X |
| 4,433,434 | 2/1984 | Mozer | 84/622 X |
| 4,433,604 | 2/1984 | Ott | 84/DIG. 9 |
| 4,554,858 | 11/1985 | Wachi et al. | |
| 4,618,985 | 10/1986 | Pfeiffer | 395/2.7 |
| 4,700,603 | 10/1987 | Takauji et al. | 84/622 |
| 4,916,996 | 4/1990 | Suzuki et al. | 84/622 X |
| 5,086,475 | 2/1992 | Kutaragi et al. | 84/603 X |
| 5,252,776 | 10/1993 | Mutoh | 84/661 X |
| 5,276,275 | 1/1994 | Suzuki et al. | 84/661 |
| 5,300,724 | 4/1994 | Medovich | 84/627 X |
| 5,308,918 | 5/1994 | Yamauchi et al. | 84/622 |
| 5,313,013 | 5/1994 | Suzuki et al. | 84/622 |
| 5,430,241 | 7/1995 | Furuhashi et al. | 84/603 |

OTHER PUBLICATIONS

Jean–Louis Meillier and Antoine Chaigne, *AR Modeling of Musical Transients* pp. 3649–3652, IEEE Conference, Jul. 1991.

Laurence R. Rabiner and Ronald W. Schafer, *Digital Processing of Speech Signals* pp. 424–425 Prentice–Hall Signal Processing Series, 1978.

G. Bennett and X.Rodet, *Current Directions in Computer Music Research: Synthesis of the Singing Voice* pp. 20–21 MITPress, 1989.

Markle and Gray, *Linear Predictive Coding of Speech* pp. 396–401, Springer–Verlag, 1976.

*DigiTech Vocalist VHM5 Facts and Spec* pp. 106–107, In Review, Jan., 1992.

Julius O. Smith, *Techniques for Digital Filter Design and System Identification with Application to the Violin* CCRMA, Department of Music, Stanford University, Jun., 1983.

Eberhard Zwicker & Bertram Scharf, *A Model of Loudness Summation* pp. 3–26, Psychological Review, vol. 72, No. 1, Feb., 1965.

(List continued on next page.)

*Primary Examiner*—Stanley J. Witkowski

*Attorney, Agent, or Firm*—Townsend and Townsend and Crew LLP

[57] ABSTRACT

An electronic music system which imitates acoustic instruments addresses the problem wherein the audio spectrum of a a recorded note is entirely shifted in pitch by transposition. The consequence of this is that unnatural formant shifts occur, resulting in the phenomenon known in the industry as "munchkinization." The present invention eliminates munchkinization, thus allowing a substantially wider transposition range for a single recording. Also, the present invention allows even shorter recordings to be used for still further memory improvements. An analysis stage separates and stores the formant and excitation components of sounds from an instrument. On playback, either the formant component or the excitation component may be manipulated.

20 Claims, 10 Drawing Sheets

OTHER PUBLICATIONS

Stanley P. Lipshitz, Tony C. Scott and Richard P. Gooch, *Increasing the Audio Measurement Capability of FFT Analyzers by Microcomputer Postprocessing* pp. 626–648, J. Aud. Eng. Soc., vol. 33, No. 9, Sep., 1985.

Bernard Widrow, Paul F. Titchener and Richard P. Gooch, *Adaptive Design of Digital Filters* pp. 243–246, Proc. IEEE Conf. Acoustic Speech Signal Processing, May 1981.

Manfred R. Schroeder and Bishnu S. Atal, *Code–Excited Linear Prediction: High Quality Speech at Very Low Bit Rates* pp. 937–940, ICASSP.Aug. 1985.

Ian Bowler, *The Synthesis of Complex Audio Spectra by Cheating Quite a Lot* pp. 79–84, Vancouver ICMC, 1985.

X

+

X

=

DIGITAL SAMPLING INSTRUMENT

CROSS-REFERENCE TO RELATED APPLICATIONS

This application is a file wrapper continuation of application Ser. No. 08/077,424, filed Jun. 15, 1993, abandoned, which is a division of application Ser. No. 07/854,554, filed Mar. 20, 1992, now U.S. Pat. No. 5,248,845.

The present application is related to co-pending applications Ser. No. 07/462,392 filed Jan. 5, 1990 entitled Digital Sampling Instrument for Digital Audio Data; Ser. No. 07/576,203 filed Aug. 29, 1990 entitled Dynamic Digital IIR Audio Filter; and Ser. No. 07/670,451 filed Mar. 8, 1991 entitled Dynamic Digital IIR Audio Filter.

BACKGROUND OF THE INVENTION

The present invention relates to a method and apparatus for the synthesis of musical sounds. In particular, the present invention relates to a method and apparatus for the use of digital information to generate a natural sounding musical note over a range of pitches.

Since the development of the electronic organ, it has been recognized as desirable to create electronic keyboard musical instruments capable of imitating other accoustical instruments, i.e. strings, reeds, horns, etc. Early electronic music synthesizers attempted to acheive these goals using analog signal oscillators and filters. More recently, digital sampling keyboards have most successfully satisfied this need.

It has been recognized that notes from musical instruments may be decomposed into an excitation component and a broad spectral shaping outline called the formant. The overall spectrum of a note is equal to the product of the formant and the spectrum of the excitation. The formant is determined by the structure of the instrument, i.e. the body of a violin or guitar, or the shape of the throat of a singer. The excitation is determined by the element of the instrument which generates the energy of the sound, i.e. the string of a violin or guitar, or the vocal chords of a singer.

Workers in speech waveform coding have used formant/excitation analyses with radically different assumptions and objectives than music synthesis workers. For instance, for speech coding applications the required quality is lower than for musical applications, and the speech waveform coding is intended to efficiently represent a intelligible message. On the other hand, providing expression or the ability to manipulate the synthesis parameters in a musically meaningful way is very important in music. Changing the pitch of a synthesized signal is fundamental to performing a musical passage, whereas in speech synthesis the pitch of the synthesized signal is determined only by the input signal (the sender's voice). Furthermore, control and variation of the spectrum or amplitude of the synthesized signal is very important for musical applications to produce expression, while in speech synthesis such variations would be irrelevant and produce a degradation in the intellegibility of the signal.

Physical modelling approaches (see U.S. patent applications Ser. Nos. 766,848 and 859,868, filed Aug. 16, 1985 and May 2, 1986, respectively) attempt to model each individual physical component of acoustic instruments, and generate the waveforms from first principles. This process requires a detailed analysis of isolated subsystems of the actual instrument, such as modelling the clarinet reed with a polynomial, the clarinet body with a filter and delay line, etc.

Vocoding is a related technology that has been in use since the late 1930's primarily as a speech encoding method, but which has also been adapted for use as a musical special effect to produce unusual musical timbres. There have been no examples of the use Vocoding to de-munchkinize a musical signal after it has been pitch-shifted, although this should in principle be possible.

Digital sampling keyboards, in which a digital recording of a single note of an accoustic instrument is transposed, or pitch-shifted to create an entire keyboard range of sound have two major shortcomings. First, since a single recording is used to produce many notes by simply changing the playback speed, the audio spectrum of the recorded note is entirely shifted in pitch by the desired transposition. The consequence of this is that unnatural shifts in the formant shifts occur. This phenomenon is referred to in the industry as "munchkinization" after the strange voices of the munchkins in the classic movie "The Wizard of Oz", which were produced by this effect. It is also referred to as a "chipmunk" effect, after the voices of the children's television cartoon program called "The Chipmunks", which were also produced by increasing the playback rate of recorded voices. The second major shortcoming of pitch shifting is a lack of expressiveness. Expressiveness is considered a very important feature of traditional acoustical musical instruments, and when it is lacking, the instrument is considered to sound unpleasant or mechanical. Expressiveness is considered to have a deterministic and a stochastic component.

One current remedy for munchkinization is to limit the transposition range of a given recording. Separate recordings are used for different pitch ranges, thereby requiring greater memory requirements and producing problems in the matching of timbre of recordings across the keyboard.

The deterministic component of expression is associated with the non-random variation of the spectrum or transient details of the note as a function of user control input, such as pitch, velocity of keystroke, or other control input. For example, the sound generated from a violin is dependent on where the string is fretted, how the string is bowed, whether a vibrato effect is produced by "bending" the string, etc.

The stochastic component of expression is related to the random variations of the spectrum of the musical note so that no two successive notes are identical. The magnitude of these stochastic variations is not so great that the instrument is not identifiable.

SUMMARY OF THE INVENTION

The present invention provides for analyzing a sound by extracting a formant filter spectrum, inverting it and using it to extract an excitation component. The excitation component is modified, such as by pitch shifting, and a sound is synthesized using the modified excitation component and the formant filter spectrum. The present invention also provides for synthesizing sounds by generating long-term prediction coded excitation signal, inverse long-term prediction coding, then pitch shifting the decoded excitation signal and filtering the pitch shifted excitation signal with a formant filter.

An object of the present invention is to minimize the "munchkinization" effect, thus allowing a substantially wider transposition range for a single recording.

Another object of the present invention is to generate musical notes using small amounts of digital data, thereby producing memory savings.

A further object of the present invention is to produce interesting and musically pleasing (i.e. expressive) musical notes.

Another object of the present invention is to provide an embodiment wherein the analysis phase operates in real-time, simultaneously with the synthesis phase, thereby providing a "harmonizer" without munchkinization.

In one preferred embodiment, the present invention is a waveform encoding technique. An arbitrary recording of a musical instrument sound or a collection of recordings of a musical instrument or also arbitrary sound not necessarily from a musical instrument can be encoded. The present invention can benefit from physical modelling analysis strategies, but will also work with only a recording of the sound of the instrument. The present invention also allows meaningful analysis and manipulation of recorded sounds that do not come from any traditional instrument, such as manipulating sound effects a motion picture sound track might use.

If the natural instrument is particularly aptly modelled by the present invention, substantial data compression can be performed on the excitation signal. For example, if the instrument is a violin, which is in fact a highly resonant wooden body being excited by a driven vibrating string, the excitation signal resulting from extraction by an accurate inverse formant will largely represent a sawtooth waveform, which can be very simply represented.

Other objects, features and advantages of the present invention will become apparent from the following detailed description when taken in conjunction with the accompanying drawings.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1*a* depicts the Fourier spectrum of the original signal, FIG. 1*b* shows the Fourier spectrum of the excitation, and FIG. 1*c* shows the Fourier spectrum of the formant.

DETAILED DESCRIPTION OF THE PREFERRED EMBODIMENTS

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the present invention is intended to cover alternatives, modifications and equivalents, which may be included within the spirit and scope of the invention as defined by the appended claims.

The present invention can be divided into an analysis stage wherein digital sound recordings are analyzed, and a synthesis stage wherein the analyzed information is utilized to provide musical notes over a range of pitches. In the analysis stage, a formant filter and an excitation are extracted and stored. In the synthesis stage, the excitation and formant filter are manipulated and combined. The excitation will typically be pitched shifted to a desired frequency and filtered by a formant filter in real time.

If the analysis stage is performed in real-time, which is certainly practical using current signal processor technology, then the present invention allows real-time pitch shifting without introducing the undesirable munchkinization artifact, as other current methods of pitch-shifting introduce. This approach then requires a different approach to the synthesis method which is to use overlapped and crossfaded looped buffers to allow pitch-shifting the signal without altering its duration.

The analysis stage and the synthesis stage will now be described in detail.

Analysis

Figure 1A:
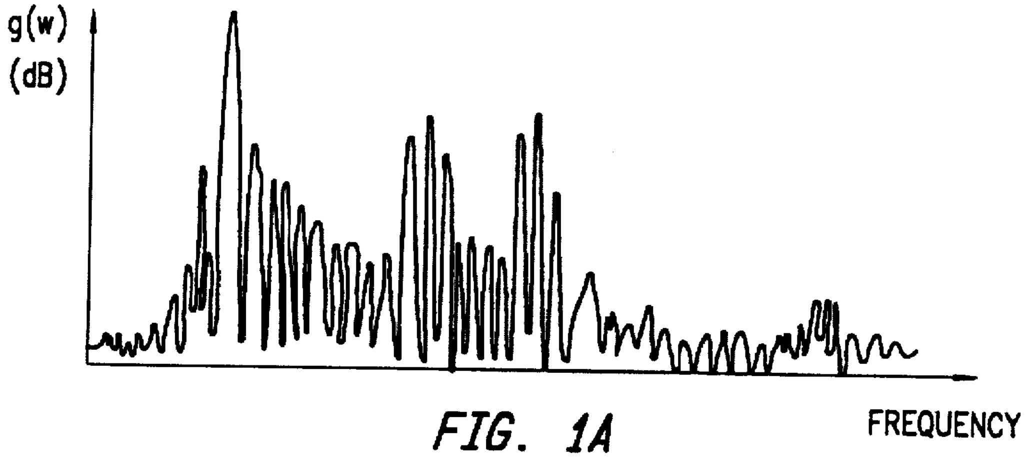
FIGS. 1*a*–1*c* depict signals which have been decomposed into a formant and an excitation.
Figure 1B:
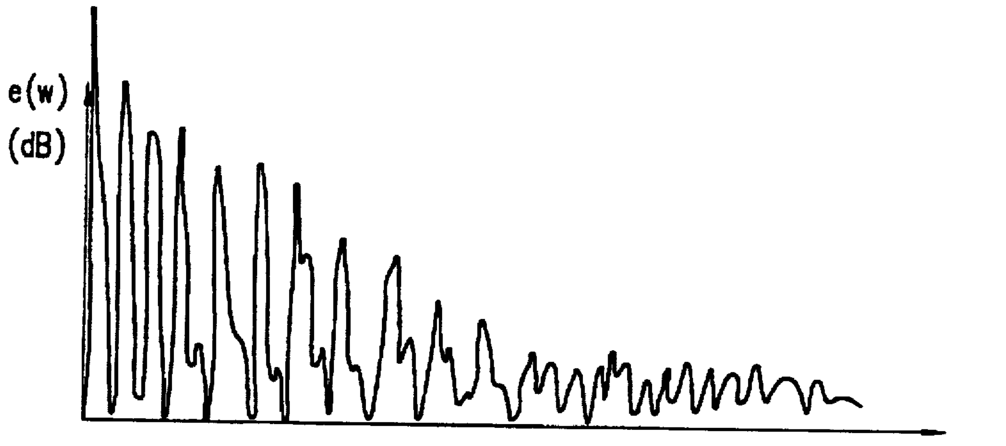
Figure 1C:
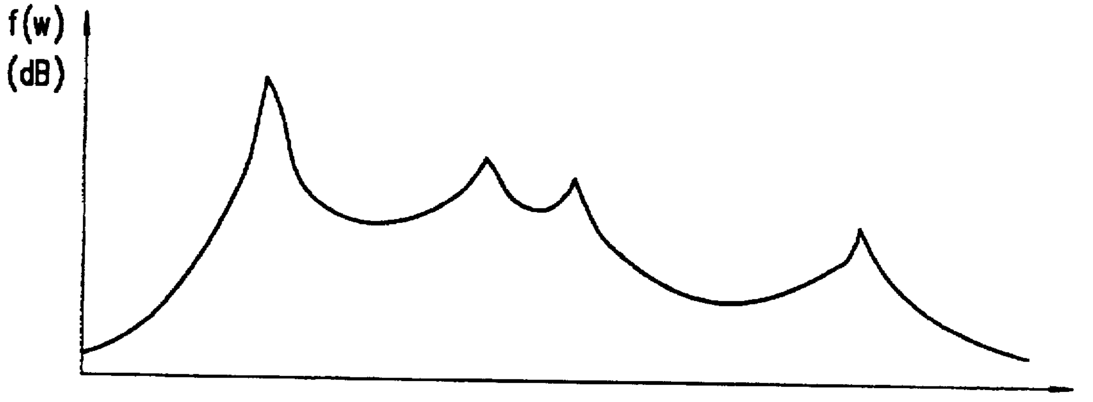

FIG. 1 depicts the Fourier spectrum of a signal g(w) which has been decomposed into a formant, f(w), and an excitation, e(w), where w is frequency. The original signal is shown in FIG. 1*a* as g(w). FIG. 1*b* shows the Fourier spectrum of the excitation component, e(w), and FIG. 1*c* show the Fourier spectrum of the formant, f(w). The product of the Fourier spectra of the formant and excitation is equal to the Fourier spectrum of the original signal, i.e.

$$g(w)=f(w)\,e(w).$$

Generally, the formant spectrum has a much broader spectrum than the excitation. By the convolution theorem this implies that $$g(t)=\int e(t')\,f(t-t')\,dt',$$

indicating that f(t) represents the impulse response of the system.

There are a number of techniques which may be utilized to determine the formant filter of an instrument. The most effective technique for a particular instrument must be determined on an empirical basis. This is an acceptable limitation, since once the determination is made the formant and excitation can be stored, and reproduction in real time requires no further empirical decisions.

Direct measurement of the formant is the most obvious method of formant spectrum determination. When the instrument to be analyzed has an obvious physical formant producing resonant structure, such as the body of a violin or guitar, this technique can be readily applied. The impulse response of the resonant structure may be determined by applying an audio impulse or white noise through a loudspeaker and recording the audio response by means of a microphone. The response is then digitized, and its Fourier transform gives the spectrum of the formants. This spectrum is then approximated to provide a formant filter by a filter parameter estimation technique. Filter parameter estimation techniques known in the art include the equation-error method, the Hankel norm, linear predictive coding, and Prony's method.

More frequently, direct measurement of the formant spectrum is impractical. In such cases the formant spectrum must be extracted from the musical output of the instrument. This process is termed "blind deconvolution." The deconvolution, or separation of the signal into excitation and formant components, is "blind" since both the excitation and formant are unknown prior to the analysis.

Figure 2:
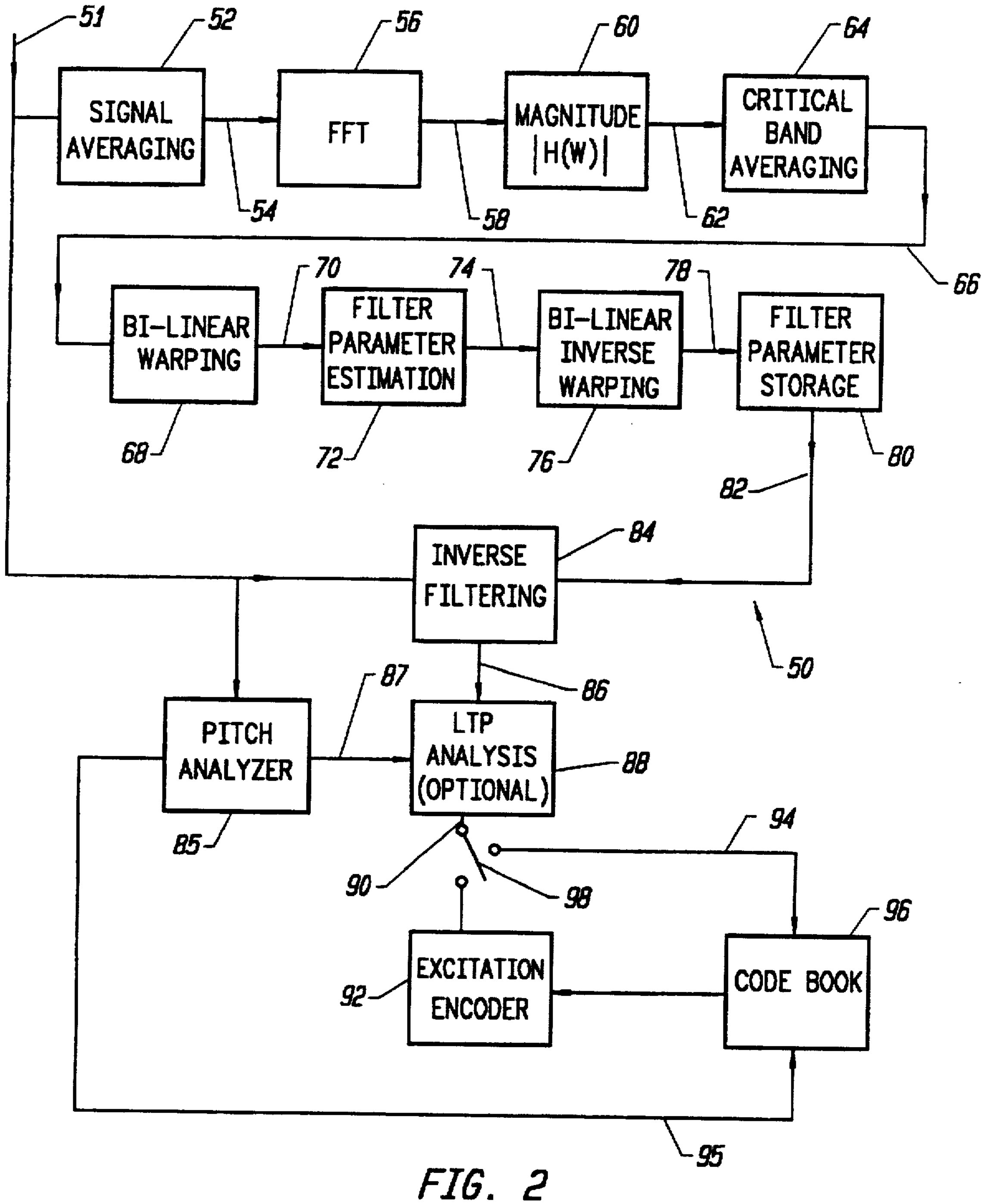
FIG. 2 shows a block diagram of a hardware implementation of the analysis section of the present invention.

FIG. 2 depicts a block diagram illustrating the process flow of an analysis circuit 50 for blind deconvolution according to the present invention. Input signals 51 are first averaged at a signal averaging stage 52 to provide an averaged signal 54 suitable for blind deconvolution. The averaged signal 54 is Fourier transformed by a Fast Fourier Transform (FFT) stage 56 to generate the complex spectrum 58 of the averaged signal 54. A magnitude spectrum 62 is generated from complex spectrum 58 at magnitude stage 60 by taking the square root of the sum of the squares of the real and imaginary parts of the complex spectrum 58.

The next two stages, critical band averaging 64 and bi-linear warping 68, deemphasize high frequency information which is not perceivable by the human ear thereby taking advantage of the ear's unequal frequency resolution to increase the efficiency of the analysis circuit 50. The critical band averaging stage 64 averages frequency bands of the magnitude spectrum 62 to generate a band averaged spectrum 66, and the bi-linear warping stage 68 performs a conformal mapping on the band averaged spectrum 66 by compressing the high frequency range and expanding the low frequency range. The filter parameter estimation stage 72 then extracts warped filter parameters 74 representing an estimated formant filter spectrum. These parameters 74 are subjected to an inverse warping process at a bi-linear inverse warping stage 76 which inverts the conformal mapping of the bi-linear warping stage 68. Output 78 of the inverse warping stage 76 are unwarped filter parameters 78 which provide an approximation to the formants of the original signals 51. These parameters 61 are stored in a filter parameter storage 80.

Excitation component 86 of input signal 51 is then extracted at inverse filtering stage 84. Inverse filtering stage 84 utilizes the filter parameter estimates 78 to generate the inverse filter 84. The excitations 86 are optionally subjected to long term predictive (LTP) analysis at LTP analysis stage 88. The LTP stage 88 requires pitch information 87 extracted from the input signal 51 by pitch analyzer 85. The LTP analysis requires single notes rather than chords or group averages as the input signal 51. During the initial portion of the analysis, process switch 98 directs the excitation signals to the codebook stage 96 for generation of a codebook. Once the codebook 96 has been generated, the excitation signal 90 is directed by switch 98 to the excitation encoder 92 for encoding as a string of codebook entries. These stages of the analysis circuit 50 are described in more detail below.

To extract the formant structure it is helpful to have some knowledge of the structure of the excitation. For instance, if the excitation is known to be an impulse or white noise, the excitation spectrum is known to be flat spectrum, and the formant is easily deconvolved from the excitation. Therefore, to improve the accuracy and reliability of the blind deconvolution formant estimates of the present invention, the spectrum analysis is performed on not one but a wide variety of notes of the scale. On instruments capable of playing many notes, the signal averaging 52 can be accomplished by analyzing a broad chord (many notes playing simultaneously) as input 51; on monophonic instruments it can be done by averaging multiple input notes 51.

Averaged signal 54 is Fourier transformed by FFT unit 56 and the magnitude 62 of the Fourier spectrum 58 is produced by magnitude calculating unit 60. Fast Fourier transforms are well known in the art.

It is known that the human ear is more sensitive and has better resolution at low frequencies than at high frequencies. Roughly, the cochlea of the ear has equal numbers of neurons in each one-third octave band above 600 Hz. The most important formant peaks are therefore in the first few hundred hertz. Above a few hundred hertz the ear cannot differentiate between closely spaced formants.

Critical band averaging stage 64 (see Ph.D. thesis of Julius O. Smith, "Techniques for Digital Filter Design and System Identification with Application to the Violin," Center for Computer Research in Music and Acoustics, Department of Music, Stanford University, Stanford, Calif. 94305) exploits the ear's unequal frequency resolution by discarding information which is not perceivable. In the critical band averaging unit 64, the spectral magnitudes 62 in each one-third octave band are averaged together. The resulting spectrum 66 is perceptually identical to the original 62, but contains much less detailed information and hence is easier to approximate with a low-order filter bank.

Figure 3A:
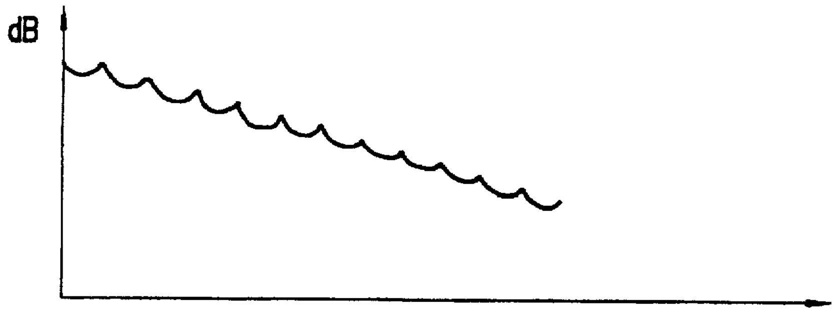
FIGS. 3A and 3B illustrate a conformal mapping which compresses the high frequency end of the spectrum and expands the low frequency end of the spectrum.
Figure 3B:
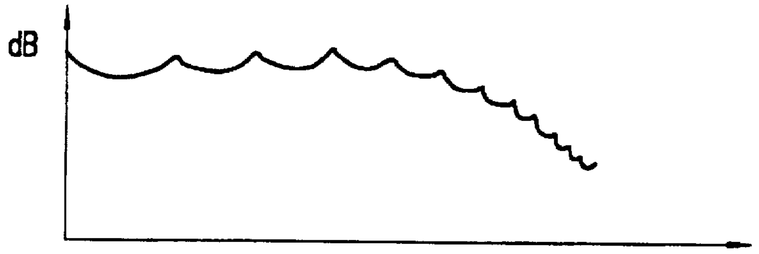

To further increase the efficiency of the circuit 50, the band averaged spectrum 66 is transformed by a bi-linear transform (see the thesis of Julius O. Smith referenced above) at bi-linear warping stage 68. Since the ear is sensitive to frequencies in an exponential way (semitonal differences are heard as being equal), and the input signal 51 has been sampled and will be treated by linear mathematics (each step of n Hertz receives equal preference) in the circuit 50, it is helpful to "warp" the spectrum in a way that the processing will give similar preferences to frequencies as does the human ear. For instance, FIG. 3 illustrates the desired warping of a spectrum. FIG. 3*a* shows the spectrum prior to the warping and FIG. 3*b* depicts the warped spectrum. Clearly, the high frequency region is compressed and the low frequency region has been expanded.

The desired warping can be acheived by means of bi-linear warping circuit 68 of FIG. 2 utilizing the conformal map $$Ma(z)=(z-a)/(1-az),$$

where a is a constant chosen based on the sampling rate. The optimum choiced of a is made by attempting to fit the curve of Ma(z) to the "Bark" tonality function (see Zwicker and Scharf, "A Model of Loudness Summation", Psychological Review, v72, #1, pp 3-26, 1965).

Alternatively, the bi-linear transform warping circuit 68 may be replaced with a filter parameter estimation method that includes a weighting function. The Equation-Error implementation in MatLab™'s INVFREQZ program is one example of such a method. INVFREQZ allows the frequency fit errors to be increased in the regions where human hearing cannot detect these errors as well.

The pre-processing warping procedures described above represents a means for implementation of the preferred embodiment; simplifications such as elimination of the conformal frequency mapping step or the weighting function can be used as appropriate. Furthermore, mathematically equivalent processes may be known to those skilled in the art.

The three basic digital filter classes are all-pole filters, all-zero filters or pole-zero filters. These filters are so named because in z-transform space, pole filters consist exclusively of pole, zero filters consist exclusively of zeros, and pole-zero filters have both poles and zeros.

Figure 4:
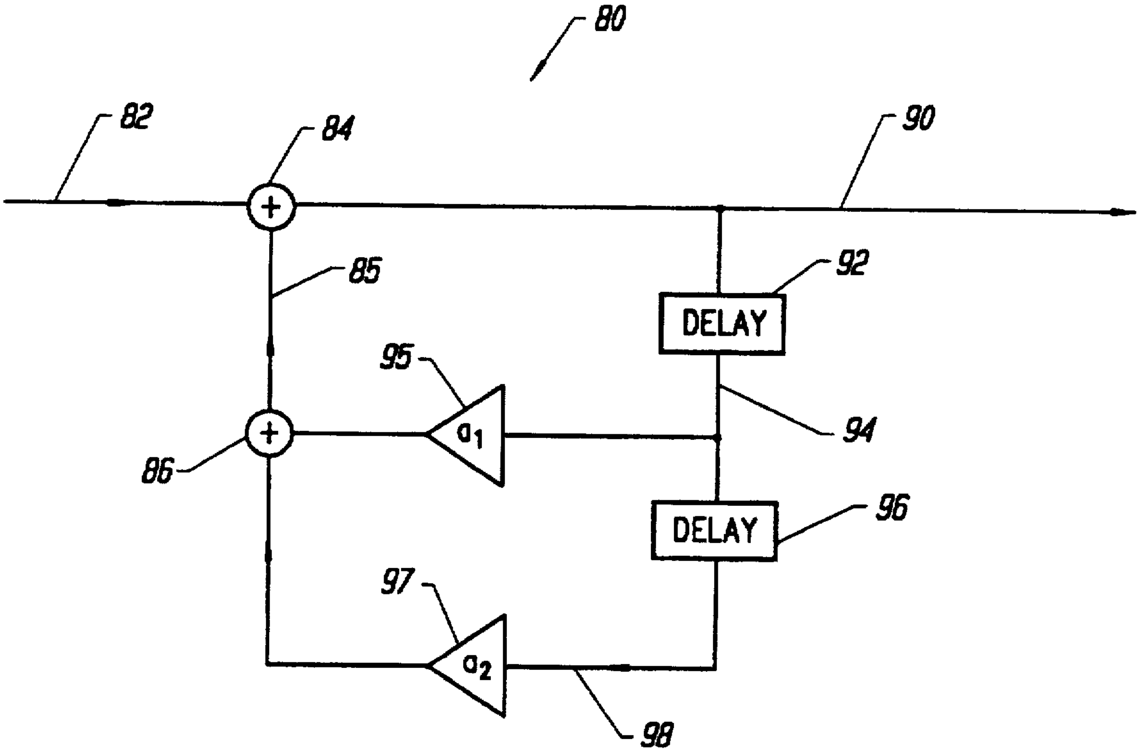
FIG. 4 depicts a second order all-pole filter

FIG. 4 shows a second order all-pole circuit 80. The filter 80 receives an input signal 82 and generates an output signal 90. The output signal 90 is delayed by one time unit at delay unit 92 to generate a first delayed signal 94, and the first delayed signal 94 is delayed by an additional time unit at delay unit 96 to generate a second delayed signal 98. The delayed signals 94 and 98 are multiplied by $a_1$ and $a_2$ at by two multipliers 95 and 97, respectively, and added at adders 86 and 84 to generate output signal 90. Therefore, if x(n) is the nth input signal 82, and y(n) is the nth output signal 90, the circuit performs the difference equation $$y(n)=x(n)+a_1y(n-1)+a_2y(n-2).$$

In z-transform space where $$f(z)=\Sigma_{n=1} z^{-n} f(n)$$

this corresponds to the filter function $$H(z)=1/(1-a_1 z^{-1}-a_2 z^{-2}).$$

The filter function H(z) has two poles in $z^{-1}$ space. For the transfer function to be stable, the poles of $H(z^{-1})$ must lie within the unit circle. In general, an mth order all-pole filter has a maximum time delay of m time units. All-pole filters are also referred to as autoregressive filters or AR filters.

Figure 5:
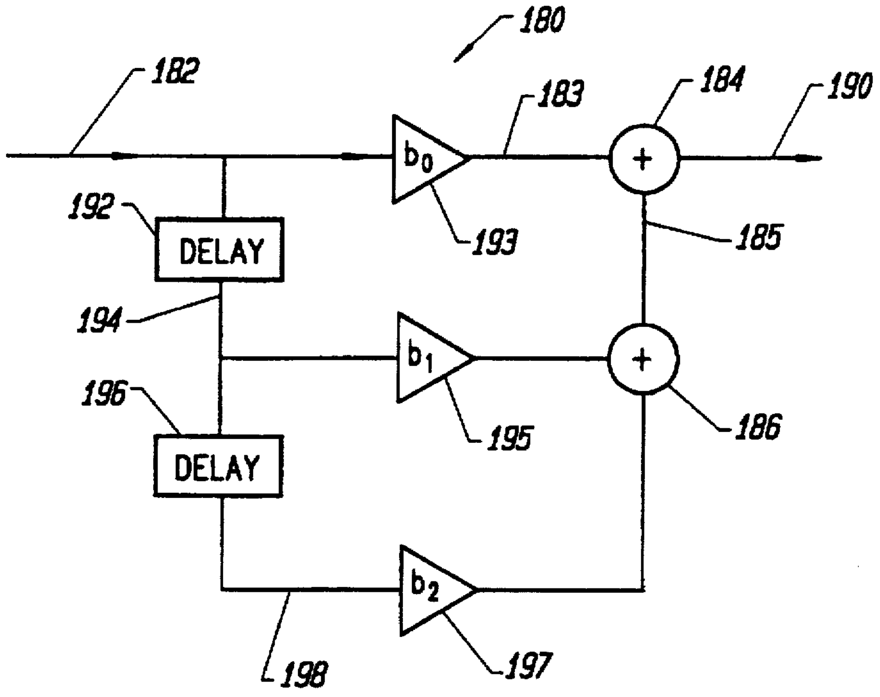
FIG. 5 depicts a second order all-zero filter.

FIG. 5 shows a second order all-zero circuit 180. The filter 180 receives an input signal 182 and generates an output signal 190. The input signal 182 is delayed by one time unit at delay unit 192 to generate a first delayed signal 194, and the first delayed signal 194 is delayed by an additional time unit at delay unit 196 to generate a second delayed signal 198. The delayed signals 194 and 198 are multiplied by $b_1$ and $b_2$ by two multipliers 195 and 197, and the undelayed signal 182 is multiplied by $b_0$ at a multiplier 193. The multiplied signals 183, 185 and 186 are summed at adders 186 and 184 to generate output signal 190. Therefore, if x(n) is the nth input signal 182, and y(n) is the nth output signal 190, the circuit performs the difference equation $$y(n)=b_0x(n)+b_1x(n-1)+b_2x(x-2).$$

In transform space this corresponds to the filter function $$H(z)=b_0+b_1 z^{-1}+b_2 z^{-2}.$$

The filter function H(z) has two zeroes in $z^{-1}$ space. In general, an mth order all-zero filter has a maximum time delay of m time units. All-zero filters are also referred to as moving average filters or MA filters.

Analysis methods for the generation of all-zero filter parameters include linear optimization methods such as Remez exchange and Parks-McClellan, and wavelet transforms. A popular implementation for wavelet transforms is known as the sub-band coder.

Figure 6:
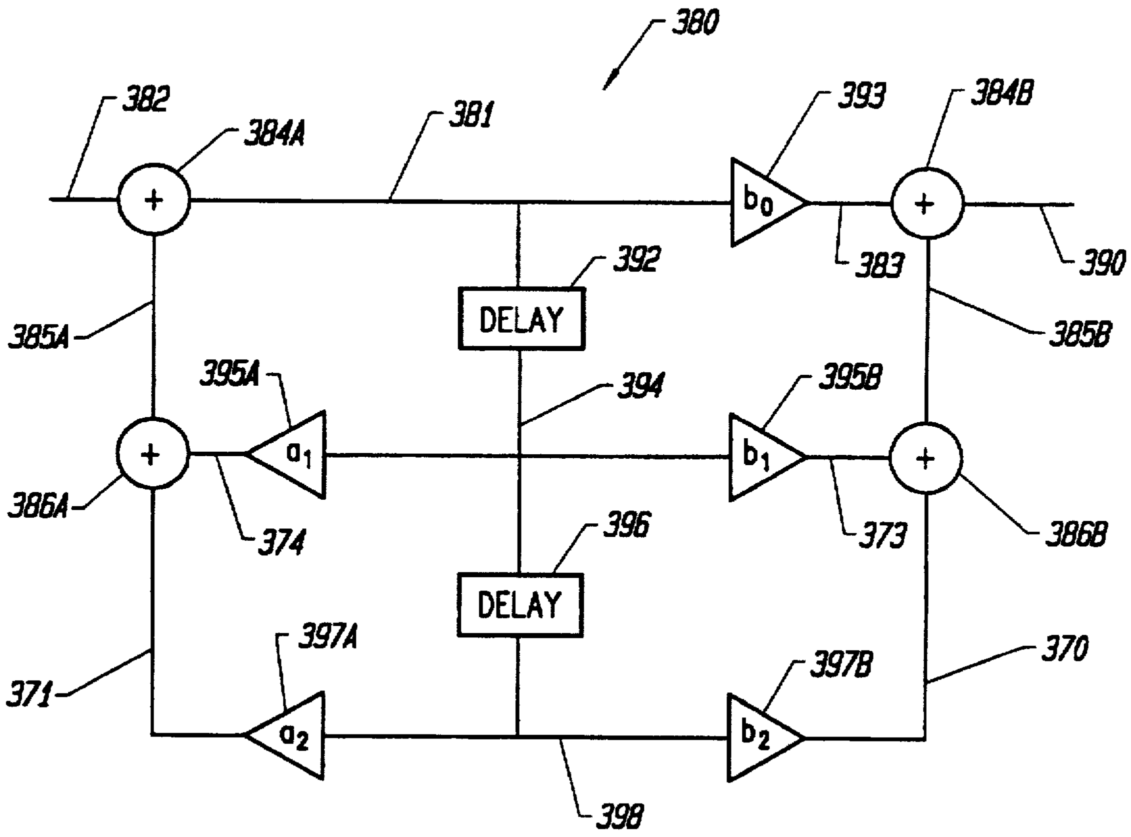
FIG. 6 depicts a second order pole-zero filter.

FIG. 6 shows a second order pole-zero circuit 380. The filter 380 receives an input signal 382 and generates an output signal 390. The input signal 382 is summed with a feedback signal 385*a* at adder 384*a* to generate an intermediate signal 381. The intermediate signal 381 is delayed by one time unit at delay unit 392 to generate a first delayed signal 394, and the first delayed signal 394 is delayed by an additional time unit at delay unit 396 to generate a second delayed signal 398. The delayed signals 394 and 398 are multiplied by $a_1$ to $a_2$ by two multipliers 395*a* and 397*a* to generate multiplied signals 374 and 371, respectively. These multiplied signals 374 and 371 are added to the input signal 382 by two adders 384*a* and 386*a* to generate intermediate signal 381. The delayed signals 394 and 398 are also multiplied by $b_1$ and $b_2$ by two multipliers 395*b* and 397*b*, and the intermediate signal 381 is multiplied by $b_0$ at a multiplier 393, to generate multiplied signals 373, 370 and 383, respectively. The multiplied signals 373, 370 and 383 are summed at adders 386*b* and 384*b* to generate output signal 390. Therefore, if x(n) is the nth input signal 382, y(n) is the nth intermediate signal 381, and z(n) is the nth output signal 390, the circuit performs the difference equations $$y(n)=x(n)+a_1y(n-1)+a_2y(n-2)$$

and $$z(n)=b_0y(n)+b_1y(n-1)+b_2y(n-2).$$

In transform space this corresponds to the filter function $$H(z)=(b_0+b_1z^{-1}+b_2z^{-2})/(1-a_1z^{-1}-a_2z^{-2}).$$

The filter function H(z) has two zeroes and two poles in $z^{-1}$ space. In general, an mth order pole-zero filter has a maximum time delay of m time units. Pole-zero filters are also referred to as autoregressive/moving average filters or ARMA filters.

Most research and practical implementations of speech encoders and music synthesizers have used filters with only poles. Mathematically speaking an nth-order all-pole filter has n zeros at infinity. These zeros are not used to shape the spectrum of the signal, and require no computational resources since they are nothing more than a mathematical artifact. In order to be an pole-zero synthesis method, the zeros need to be placed where they have some significant impact on shaping the spectrum. This then requires additional computational resources. Generally, pole-zero filters provide roughly a 3 to 1 advantage over all-poles or all-zero filters of the same order.

In contrast with all-pole and all-zero filters, there is no known algorithm that provides the best pole-zero estimate of a filter automatically. However, the Hankel norm appears to provide extremely good estimates in practice. Another method, homotopic continuation, offers the promise of globally convergant pole-zero filter modeling. Pole-zero filters are the least expensive filters to implement yet the most difficult to generate since there are no known robust methods for generating pole-zero filters, i.e. no method which consistantly produces the best answer. Numerical pole-zero filter synthesis algorithms include the Hankel norm, the equation-error method, Prony's method, and the Yule-Walker method. Numerical all-pole filter synthesis algorithms include linear predictive coding (LPC) methods (see "Linear Prediction of Speech", by Markel and Gray, Springer-Verlag, 1976).

Determining what order filter to use in modelling a given spectrum is considered a difficult problem in spectral analysis, but for engineering applications it is easy to limit the choices. Fourteenth order filters are currently efficient and economical to implement, and provide more than adequate control over the formant spectrum to implement high-quality sound synthesis using this method. Some sounds can be adequately reproduced using sixth order formant filters, and a few sounds require only second order filters.

The filter parameter estimation stage 72 of FIG. 2 may be unautomated (or manual), semi-automated, or automated. Manual editing of filter parameters is effective and practical for many types of signals, though certainly not as efficient as automatic or semi-automatic methods. In the simplest case, a single resonance can approximate a spectrum to advantage using the techniques of the current invention. If a single resonance is to be used, the angle of the resonant pole can be estimated as the position of the peak resonance in the formant spectrum, and the height of the resonant peak will determine the radius of the pole. Additional spectral shaping can be achieved by adding an associated zero. The resulting synthesized filter is in many cases adequate.

If a more complex filter is indicated either by the apparent complexity of the formant spectrum, or because an attempt using a simple filter was unsatisfactory, numerical filter synthesis is indicated. Alternatively, a software program can be used to implement the manual pattern recognition method of estimating formant peaks thereby providing a semi-automatic filter parameter estimation technique.

Although LPC coding is usually defined in the time domain (see "Linear Prediction of Speech", by Markel and Gray, Springer-Verlag, 1976), it is easily modified for analysis of frequency domain signals where it extracts the filter whose impulse response approaches the analyzed signal. Unless the excitation has no spectral stucture, that is if it is noise-like or impulse-like, the spectral structure of the excitation will be included in the LPC output. This is corrected by the signal averaging stage 52 where a variety of pitches or a chord of many notes is averaged prior to the LPC analysis.

Since the LPC algorithm is inherently a linear mathematical process, it is also helpful to warp the band averaged spectrum 66 so as to improve the sensitivity of the algorithm in regions in which human hearing is most sensitive. This can be done by pre-emphasizing the signal prior to analysis. Also, due to the exponential nature of the sensitivity to frequency of human hearing, it may prove worthwhile to lower the sampling rate of the input data for analysis so as to eliminate the LPC algorithm's tendency to provide spectral matching in the top few octaves.

Although equation-error synthesis is computationally attractive it tends to give biased estimates when the filter poles have high Q-factors. (In such cases the Hankel norm is superior.) Equation-error synthesis (see "Adaptive Design of Digital Filters", Widrow, Titchener and Gooch, Proc. IEEE Conf. Acoust Speech Sig Proc, pp243–246, 1981) requires a complex input spectrum. The equation-error technique converts the target filter specification which is the formant spectrum with minimum phase into an impulse response. It then constructs by means of a system of linear equations, the filter coefficients of a model filter of the desired order which will give an optimum approximation this impulse response. Therefore an equation-error calculation requires a complex minimum phase input spectrum and the specification of the desired order of the filter. Therefore, the first step in equation-error synthesis is to generate a complex spectrum from the warped magnitude spectrum 70 of FIG. 2. Because the equation-error method does not work with a magnitude only zero phase spectrum, a minimum phase response must be generated (see "Increasing the Audio Measurement Capability of FFT Analyzers by Microcomputer Postprocessing", Lipshitz, Scott, and Vanderkooy, J. Aud. Eng. Soc., v33 #9, pp626–648, 1985). An advantage of a stable minimum phase filter is that its inverse is always stable. The software package distributed with MatLab called INVFREQZ is an example of an implementation of the equation-error method.

The formant filter can be implemented in lattice form, ladder form, cascade form, direct form 1, direct form 2, or parallel form (see "Theory and Application of Digital Signal Processing," by Rabiner and Gold, Prentice-Hall, 1975). The parallel form is often used in practice, but has many disadvantages, namely: every zero in a parallel form filter is affected by every coefficient, leading to a very difficult structure to control, and parallel form filters have a high degree of coefficient sensitivity to quantization errors. A cascade form using second order sections is utilized in the preferred embodiment, because it is numerically well-behaved and because it is easy to control.

Once filter parameter estimation has been accomplished at the filter parameter estimation stage 72, the resultant model filter is then transformed by the inverse of the conformal map used in the warping stage 68 to give the formant filter parameters 78 of desired order. It will be noted that a filter with equal orders in the numerator and denominator will result from this inverse transformation regardless of the orders of the numerator and denominator prior to transformation. This suggests that it is best to constrain the model filter requirements in the filter parameter estimation stage 72 to pole-zero filters with equal orders of poles and zeroes.

Once the formant filter parameters 78 are known, production of the excitation signal 86 from a single digital sample 51 is straightforward. A time varying digital filter H(z,t) can be expressed as an Mth Order rational polynomial in the complex variable z:

$$H(z,t) = \frac{N(z,t)}{D(z,t)} = \frac{a_0(t) + a_1(t)\,z^1 + a_2(t)\,z^2 + \ldots a_N(t)\,z^N}{b_0(t) + b_1(t)\,z^1 + b_2(t)\,z^2 + \ldots b_D(t)\,z^D},$$

where t is time, and M is equal to the greater of N and D. The numerator N(z,t) and denominator D(z,t) are polynomials with time varying coefficients $a_i(t)$ and $b_i(t)$ whose roots represent the zeroes and poles of the filter respectively.

If the polynomial is inverted, that is if the poles and zeroes are exchanged, the result is inverse filter $H^{-1}(z,t)$. Filtering in succession by $H^{-1}(z,t)$ and H(z,t) will give the original signal, i.e.

$$H(z,t)\,H^{-1}(z,t) = D(z,t)\,N(z,t)/N(z,t)\,D(z,t) = 1,$$

assuming that the original filter is minimum phase, so that the resulting inverse filter is stable. Therefore, when the inverse filter is applied to an original signal 51 from which the formant was derived, the output 86 of this inverse filter 84 is an excitation signal which will reproduce the original recording when filtered by the formant filter H(z,t). The inverse filtering stage 84 will typically be performed in a general purpose digital computer by direct implementation of the above filter equations.

In an alternative embodiment the critical band averaged spectrum 66 is used directly to provide the inverse formant filtering of the original signal 51.

The optional long-term prediction (LTP) stage 88 of FIG. 2 exploits long-term correlations in the excitation signal 86 to provide an additional stage of filtering and discard redundant information. Other more sophisticated LTP methods can be used including the Karplus-Strong method.

Figure 9:
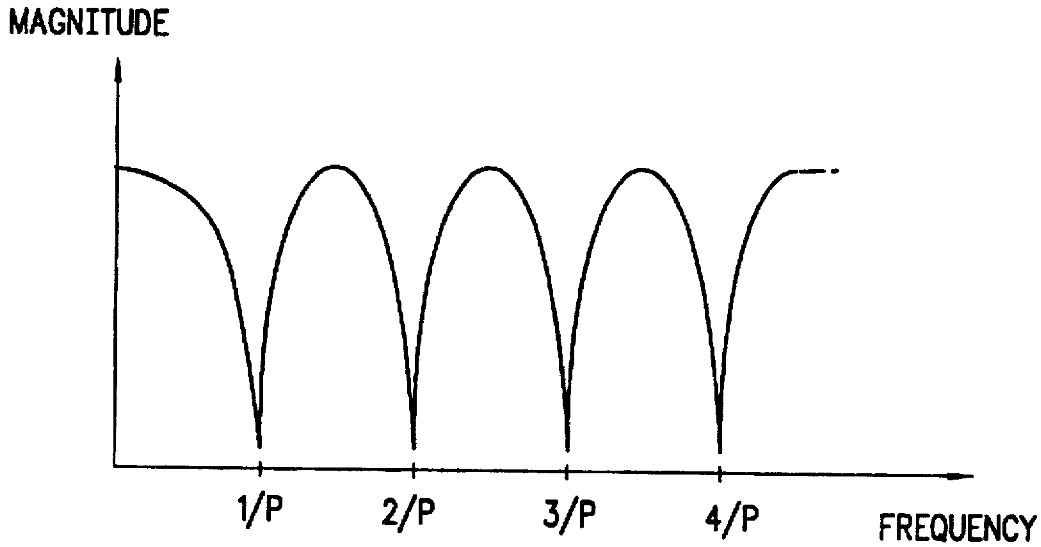
FIG. 9 shows the frequency response of long-term predictive analysis circuits.

LTP encoding performs the difference equation $$y[n] = x[n] - b\,y[n-P],$$

where x[n] is the $n^{th}$ input, y[n] is the $n^{th}$ output, and P is the period. By subtracting the signal y[n−P] from the signal x[n], the LTP circuit acts as the notch filter shown in FIG. 9 at frequencies (n/P), where n is integer. If the input signal 86 is periodic, then the output 90 is null. If the input signal 86 is approximately periodic, the output is a noise-like waveform with a much smaller dynamic range than the input 86. The smaller dynamic range of an LTP coded signal allows for improved efficiency of coding by requiring very few bits to represent the signal. As will be discussed below, the noise-like LTP encoded waveforms are well suited for codebook encoding thereby improving expressivity and coding efficiency.

Figure 12:
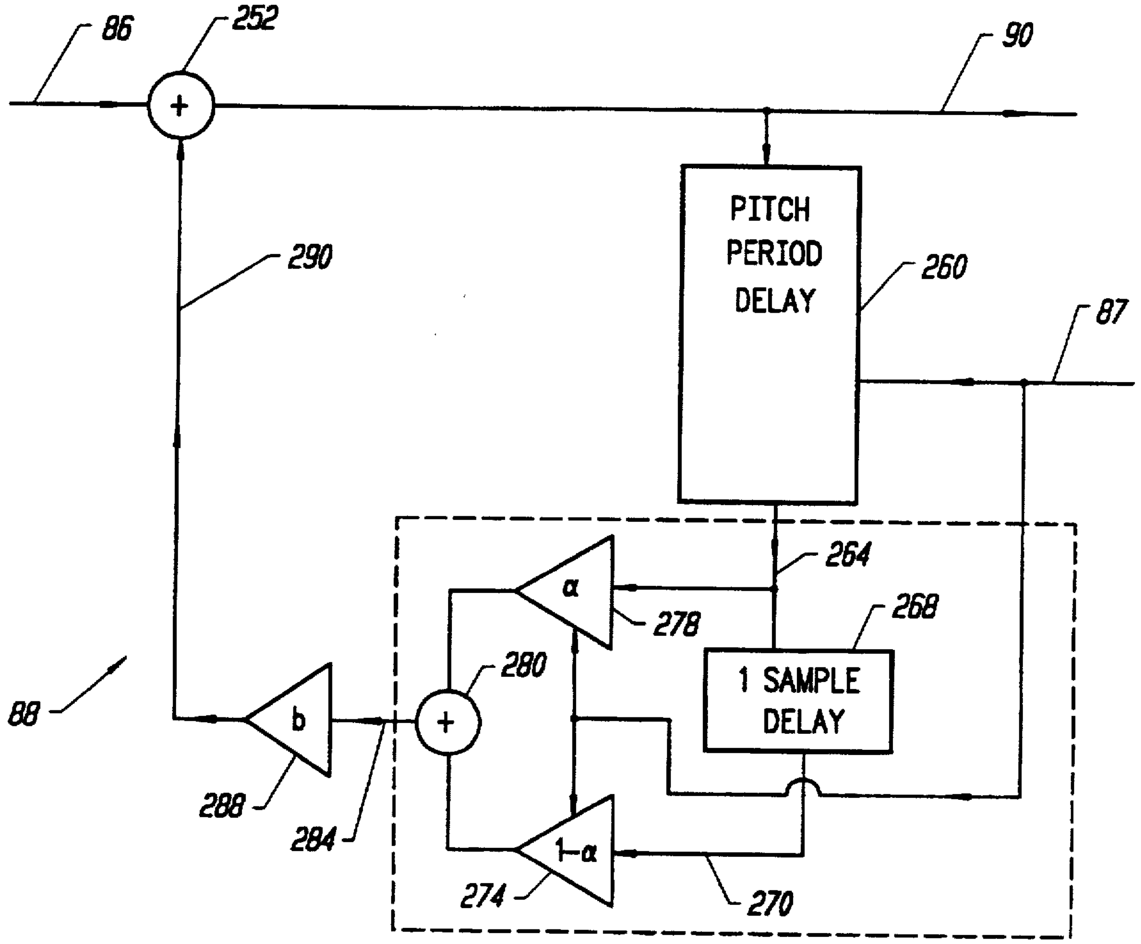
FIG. 12 shows a long-term predictive synthesis circuit.

The circuitry of the LTP stage 88 is shown in FIG. 12. In FIG. 12 input signal 86 and feedback signal 290 are fed to adder 252 to generate output 90. Output 90 is delayed at pitch period delay unit 260 by N samples intervals where N is the greatest integer less than the period P of the input signal 51 (in time units of the sample interval). Fractional delay unit 262 then delays the signal 264 by (P–N) units using a two-point averaging circuit. The value of P is determined by pitch signal 87 from pitch analyzer unit 85 (see FIG. 2), and the value of a α is set to (1–P+N). The pitch signal 87 can be determined using standard AR gradient based analysis methods (see "Design and Performance of Analysis By-Synthesis Class of Predictive Speech Coders," R. C. Rose and T. P. Barnwell, IEEE Transactions on Acoustics, Speech and Signal Processing, V38, #9, September 1990). The pitch estimate 87 can often be improved by a priori knowledge of the approximate pitch.

The part of delayed signal 264 that is delayed by an additional sample interval at 1 sample delay unit 268 is amplified by a factor (1–α) at the (1–α)-amplifier 274, and added at adder 280 to delayed signal 264 which is amplified by a factor α at α-amplifier 278. The ouput 284 of the adder 288 is then effectively delayed by P sample intervals where P is not necessarily an integer. The P-delayed output 284 is amplified by a factor b at amplifier 288 and the output of the amplifier 288 is the feedback signal 290. For stability the factor b must have an absolute value less than unity. For this circuit to function as a LTP circuit the factor b must be negative.

Figure 8:
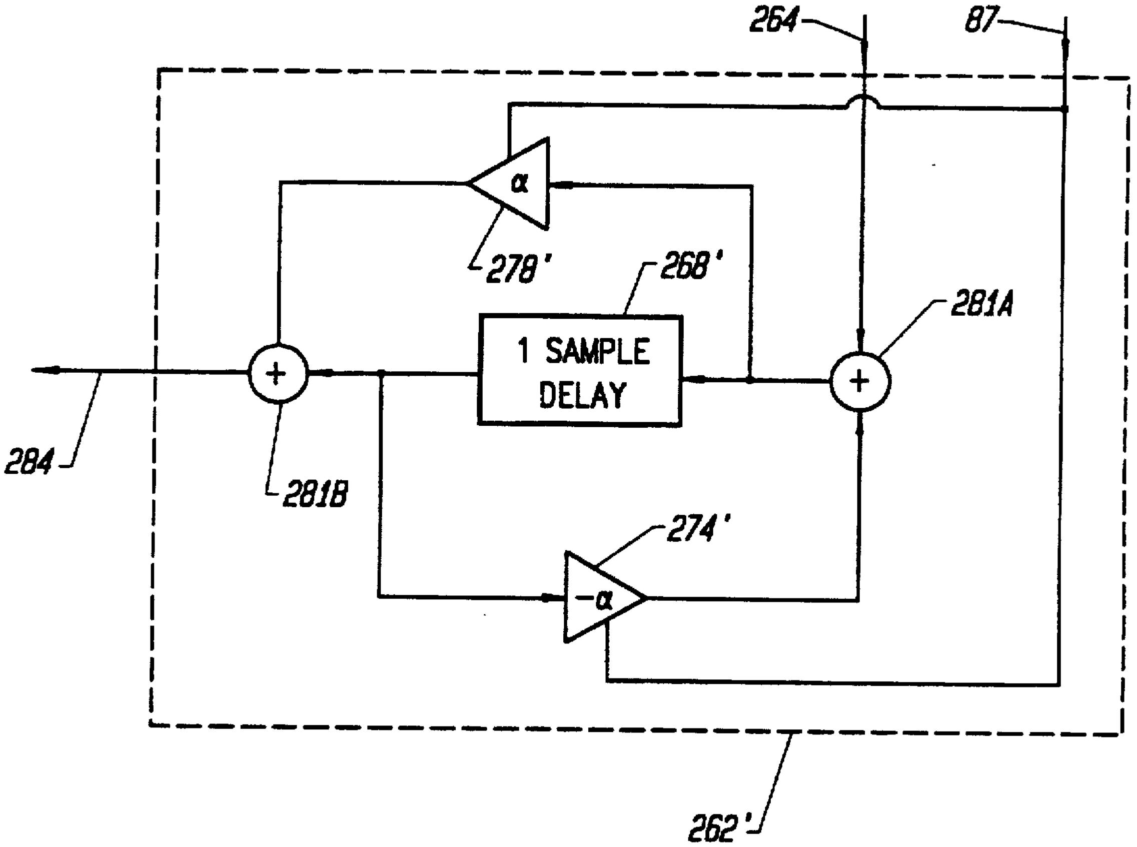
FIG. 8 shows an alternate fractional delay circuit.

Although the two-point averaging filter 262 is straightforward to implement it has the drawback that it acts as a low-pass filter for values of α near 0.5. The all-pass filter 262' shown in FIG. 8 may in some instances be preferable for use as the fractional delay section of the LTP circuit 88 since the frequency response of this circuit 262' is flat. Pitch signal 87 determines α to be (1–P+N) in the α-amplifier 278' and the (–α)-amplifier 274'. A band limited interpolator (as described in the above-identified cross-referenced patent applications) may also be used in place of two-point averaging circuit 262.

The excitation signal 86 or 90 thus produced by the inverse filtering stage 84 or the LTP analysis 88, respectively, can be stored in excitation encoder 92 in any of the various ways presently used in digital sampling keyboards and known to those skilled in the art, such as read only memory (ROM), random access read/write memory (RAM), or magetic or optical media.

The preferred embodiment of the invention utilizes a codebook 96 (see "Code-Excited Linear Prediction (CELP): High-Quality Speech at Very Low Bit Rates," Atal and Schroeder, International Conference on Accoustics, Speech and Signal Processing, 1985). In codebook encoding the input signal is divided into short segments, for music 128 or 256 samples is practical, and an amplitude normalized version of each segment is compared to every element of a codebook or dictionary of short segments. The comparison is performed using one of many possible distance measurements. Then, instead of storing the original waveform, only the sequence of codebook entries nearest the original sequence of original signal segments is stored in the excitation encoder 92.

One distance measurement which provides a perceptual relevant measure of timbre similarity between the $i^{th}$ tone and the $j^{th}$ tone (see "Timbre as a Multidimensional Attribute of Complex Tones," R. Plomp and G. F. Smorrenburg, Ed., Frequency Analysis and Periodicity Detection in Hearing, Pub. by A. W. Sijthoff, Leiden, pp. 394–411, 1970) is given by $$[\Sigma_{k=1}^{16}(L[i,k]-L[j,k])^p]^{1/p}$$

where L[i,k] is the sound pressure level of signal i at the output of a kth ⅓ octave bandpass filter. A set of codebook entries can be easily organized by projecting the 16 dimensional L vectors onto a three dimensional space and considering vectors closely spaced in the three dimensional space as perceptually similar. R. Plomp showed that a projection to three dimensions discards little perceptual information. With p=2, this is the preferred distance measurement.

The standard Euclidean distance measurement also works well. In this measure the distance between waveform segment x[n] and codebook entry y[n] is given by $$(1/M)[\Sigma_{n=1}^{M}(x[n]-y[n])^{2}]^{1/2}.$$

Another common distance measure, the Manhattan distance measurement, has the computational advantage of not requiring any multiplications. The Manhattan distance is given by $$(1/M)\Sigma_{n=1}^{M}|x[n]-y[n]|.$$

Using one of the aforementioned distance measurements, the codebook 96 can be generated by a number of methods. A preferred method is to generate codebook elements directly from typical recorded signals. Different codebooks are used for different instruments, thus optimizing the encoding procedure for an individual instrument. A pitch estimate 95 is sent from the pitch analyzer 85 to the codebook 96, and the codebook 96 segments the excitation signal 94 into signals of length equal to the pitch period. The segments are time normalized (for instance, the above-identified cross-referenced patent applications) to a length suited to the particulars of the circuitry, usually a number close to $2^n$, and amplitude normalized to make efficient use of the bits allocated per sample. Then the distance between every wave segment and every other wave segment is computed using one of the distance measurements mentioned above. If the distance between any two wave segments falls below a standard threshold value, one of the two 'close' wavesegments is discarded. Those remaining wave-segments are stored in the codebook 96 as codebook entries.

Another technique may be used if the LTP analysis is performed by the LTP analysis stage 88. Since the excitation 90 is noise-like when LTP analysis is perfomed, the codebook entries can be generated by simply filling the codebook with random Gaussian noise.

Synthesis

Figure 10:
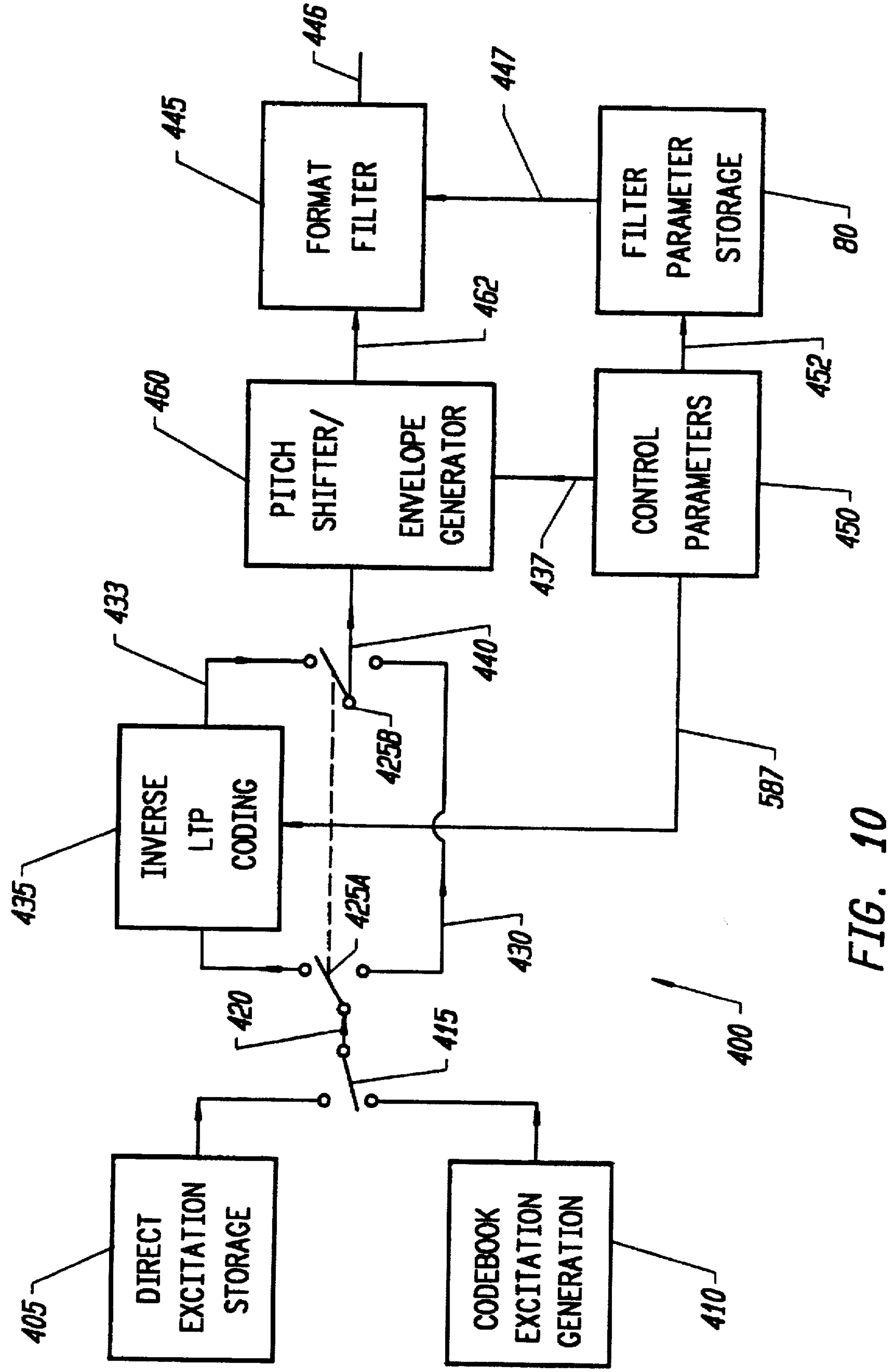
FIG. 10 shows a block diagram of the synthesis section of the present invention.
Figure 11A:
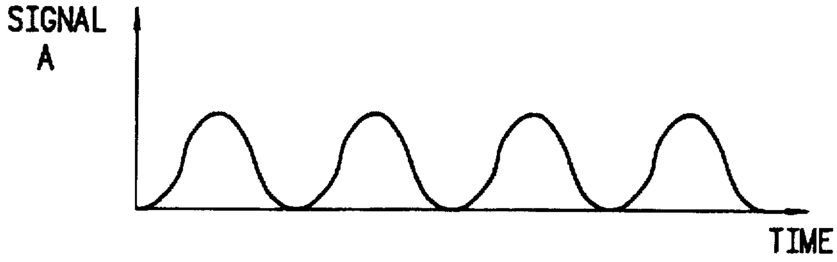
FIG. 11A–E depict cross-fading between two signals.
Figure 11B:
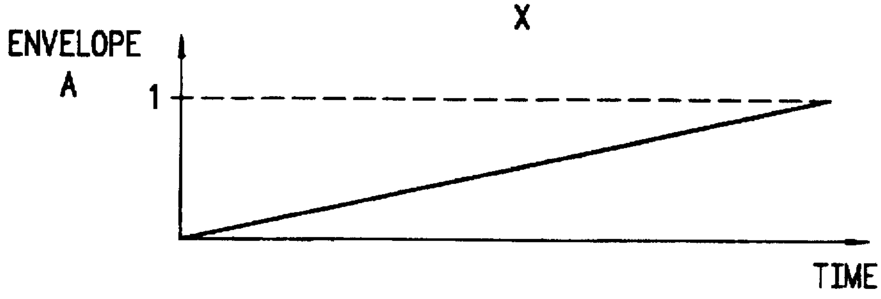
Figure 11C:
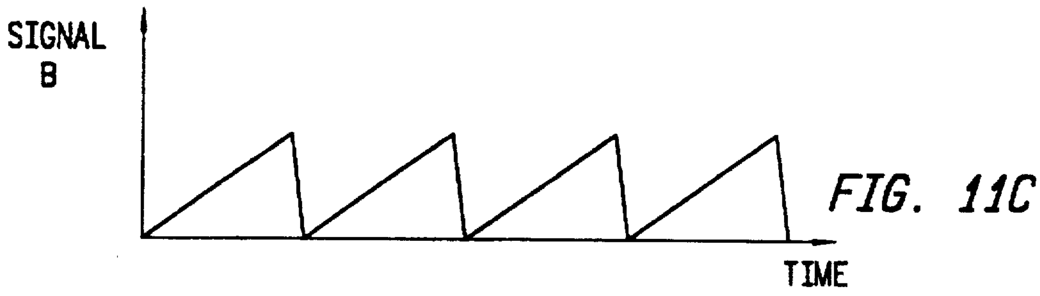
Figure 11D:
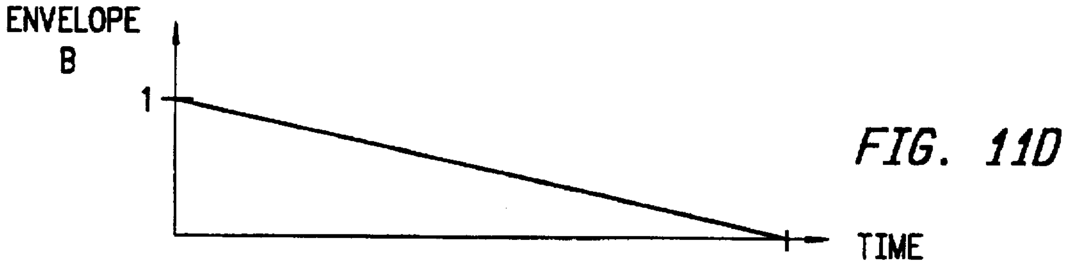
Figure 11E:
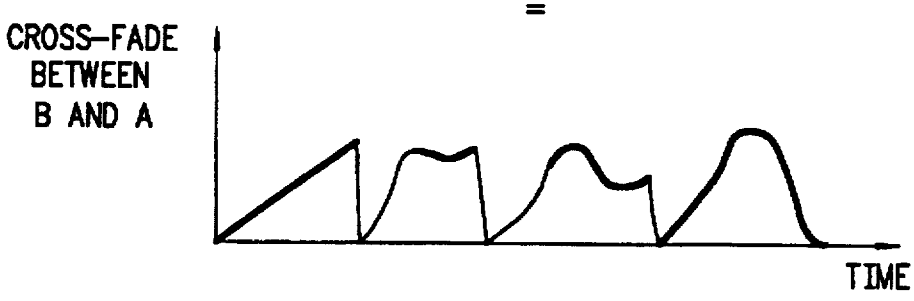

A block diagram of the synthesis circuit 400 of the present invention is shown in FIG. 10. Because switches 415 and 425(*a* and *b*) have two positions each, there are four possible modes in which the synthesis circuit 400 can operate. Excitation signal 420 can either come from direct excitation storage unit 405, or be generated from a codebook excitation generation unit 410, depending on the position of switch 415. If the excitation 420 was LTP encoded in the analysis stage, then coupled switches **425*a* and 425*b* direct the excitation signal to the inverse LTP encoding unit 435 for decoding, and then to the pitch shifter/envelope generator 460. Otherwise switches 425*a* and 425*b* direct the excitation signal 420 past the inverse LTP encoding unit 435, directly to the pitch shifter/envelope generator 460. Control parameters 450 determined by the instrument selected, the key or keys depressed, the velocity of the key depression, etc. determine the shape of the envelope modulated onto the excitation 440, and the amount by which the pitch of the excitation 440 is shifted by the pitch shifter/envelope generator 460. The output 462 of the pitch shifter/envelope generator 460 is fed to the formant filter 445. The filtering of the formant filter 445 is determined by filter parameters 447 from filter parameter storage unit 80. The user's choice of control parameters 450, including the selection of an instrument, the key velocity, etc. determines the filter parameters 447 selected from the filter parameter storage unit 80. The user may also be given the option of directly determining the filter parameters 447. Formant filter output 465** is sent to an audio transducer, further signal processors, or a recording unit (not shown).

A codebook encoded musical signal may be synthesized by simply concatenating the sequence of codebook entries corresponding to the encoded signal. This has the advantage of only requiring a single hardware channel per tone for playback. It has the disadvantage that the discontinuities at the transitions between codebook entries may sometimes be audible. When the last element in the series of codebook entries is reached, then playback starts again at the beginning of the table. This is referred to as "looping," and is analogous to making a loop of analog recording tape, which was a common practice in electronic music studios of the 1960's. The duration of the signal being synthesized is varied by increasing or decreasing the number of times that a codebook entry is looped.

Audible discontinuities due to looping or switching between codebook entries can be eliminated by a method known as cross-fading. Cross-fading between a signal A and a signal B is shown in FIG. 11 where signal A is modulated with an ascending envelope function such as a ramp, and signal B is modulated with a descending envelope such as a ramp, and the cross faded signal is equal to the sum of the two modulated signals. A disadvantage of cross-fading is that two hardware channels are required for playback of one musical signal.

Deviations from an original sequence of codebook entries produces an expressive sound. One technique to produce an expressive signal while maintaining the identity of the original signal is to randomly substitute a codebook entry "near" the codebook entry originally defined by the analysis procedure for each entry in the sequence. Any of the distance measures discussed above may be used to evaluate the distance between codebook entries. The three dimensional space introduced by R. Plomp proves particularly convenient for this purpose.

Figure 13:
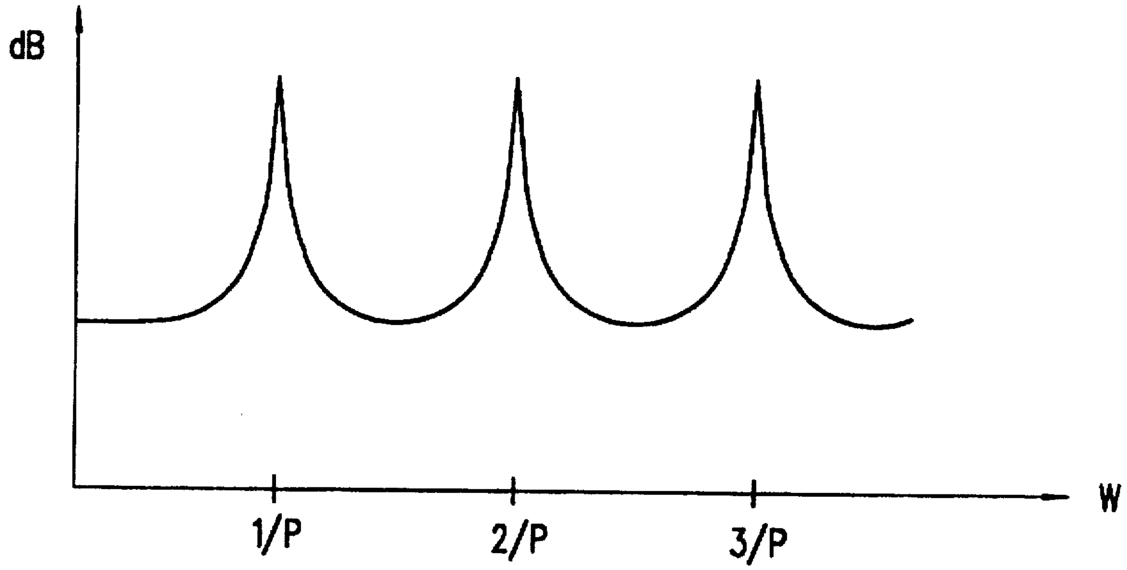
FIG. 13 shows the frequency response of inverse long-term predictive synthesis circuits.

When excitation 90 has been LTP encoded in the analysis stage, in the synthesis stage the excitation 420 must be processed by the inverse LTP encoder 435. Inverse LTP encoding performs the difference equation $$y[n]=x[n]+b\ x[n-P],$$

where x[n] is the $n^{th}$ input, y[n] is the $n^{th}$ output, and P is the period. By adding the signal b x[n−P] to the signal x[n], the inverse LTP circuit acts as a comb filter as shown in FIG. 13 at frequencies (n/P), where n is integer. A series circuit of an LTP encoder and an inverse LTP encoder will produce a null effect.

Figure 7:
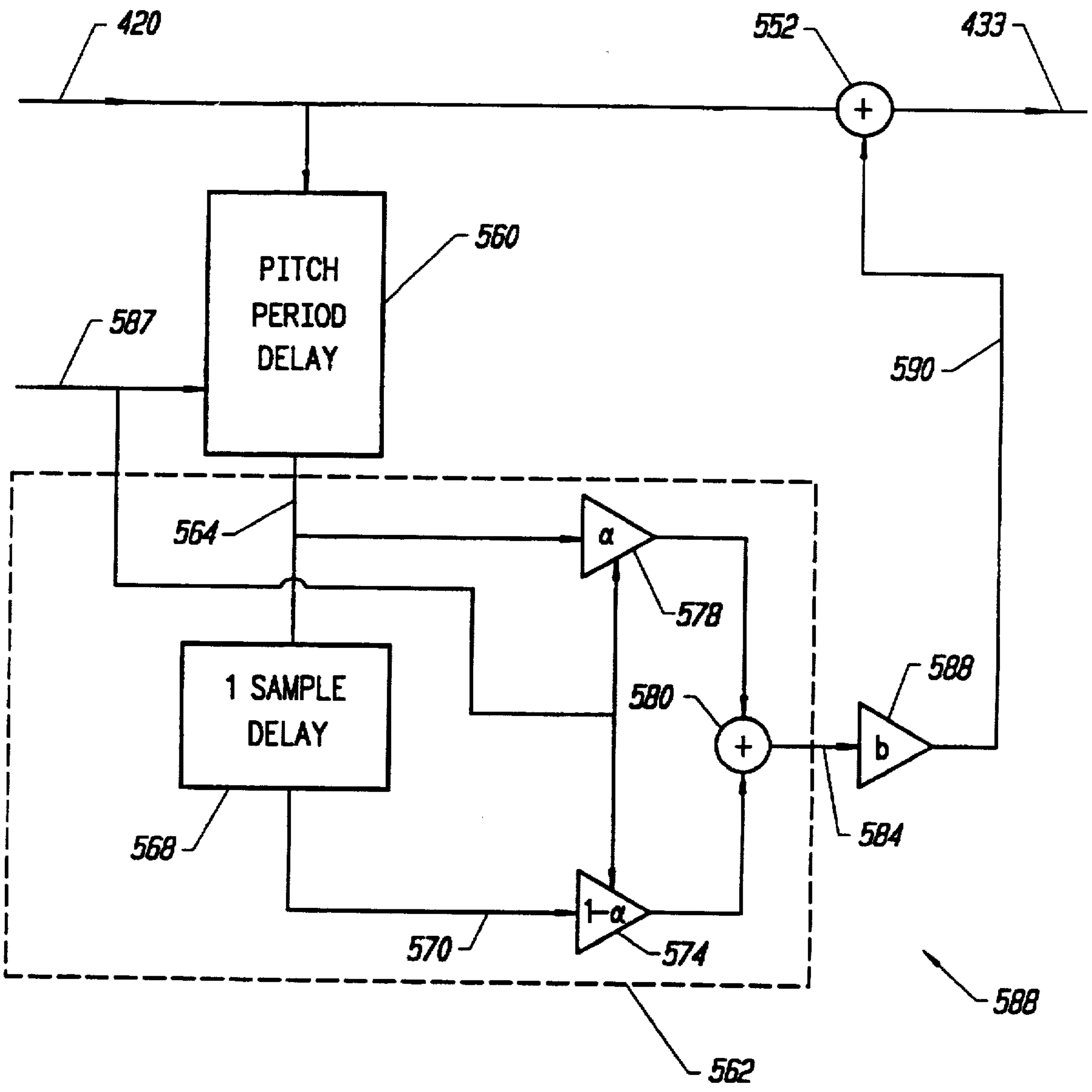
FIG. 7 shows an inverse long-term predictive analysis circuit.

The circuitry of the inverse LTP stage 588 is shown in FIG. 7. In FIG. 7 input signal 420 and delayed signal 590 are fed to adder 552 to generate output 433. Input 420 is delayed at pitch period delay unit 560 by N samples intervals where N is the greatest integer less than the period P of the input signal 420 (in time units of the sample interval). Fractional delay unit 562 then delays the signal 564 by (P−N) units using a two-point averaging circuit. The value of P is determined by pitch signal 587 form the control parameter unit 450 (see FIG. 10), and the value of α is set to (1−N+P).

The part of delayed signal 564 that is delayed by an additional sample interval at 1 sample delay unit 568 is amplified by a factor (1−α) at the (1−α)-amplifier 574, and added at adder 580 to the delayed signal 564 which is amplified by a factor α at α-amplifier 578. The ouput 584 of the adder 588 is then effectively delayed by P sample intervals where P is not necessarily an integer. The P-delayed output 584 is amplified by a factor b at b-amplifier 588 and the output of the b-amplifier 588 is the delayed signal 590. For stability the factor b must have an absolute value less than unity. For this circuit to function as a LTP circuit the factor b must be positive.

Although the two-point averaging filter 562 is straightforward to implement it has the drawback that it acts as a low-pass filter for values of α near 0.5. An all-pass filter may in some instances be preferable for use as the fractional delay section of the inverse LTP circuit 588 since the frequency response of this circuit is flat. A band limited interpolator may also be used in place of the two-point averaging circuit 262.

The excitation signal 440 is then shifted in pitch by the pitch shifter/envelope generator 460. The excitation signal 440 is pitch shifted by either slowing down or speeding up the playback rate, and this is accomplished in a sampled digital system by interpolations between the sampled points stored in memory. The preferred method of pitch shifting is described in the above-identified cross-referenced patent applications, which are incorporated herein by reference. This method will now be described.

Pitch shifting by a factor β requires determination of the signal at times (δ+n β), where δ is an initial offset, and n=0, 1, 2, . . . To generate an estimate of the value of signal X at time (i+f) where i is an integer and f is a fraction, signal samples surrounding the memory location i is convolved with an interpolation function using the formula:

$$Y(i+f)=X(i-n+1)/2C_0(f)+X(i-n+3)/2C_1(f)\ .\ .\ .\ +X(i+n-1)/2C_n(f).$$

where $C_i(f)$ represents the $i^{th}$ coefficient which is a function of f. Note that the above equation represents an odd-ordered interpolator of order n, and is easily modifed to provide an even-ordered interpolator. The coefficients $C_i(f)$ represent the impulse response of a filter, which can be optimally chosen according to the specification of the above-identified cross-referenced patent applications, and is approximately a windowed sinc function.

All of the above techniques yield a single fixed formant spectrum, which will ultimately result in a single non-time-varying formant filter. This will be found to work well on many instruments, particularly those whose physics are in close accordance with the formant/excitation model. Signals from instruments such as a guitar have strong fixed formant structure, and hence typically do not need a varible formant filter. However, the applicability of the current invention extends beyond these instruments by means of implementing a time varying formant filter. For some musical signals, such as speech or trombone, a variable filter bank is preferred since the excitation is relatively static while the formant spectrum varies with time.

Spectral analysis can be used to determine a time varying spectrum, which can then be synthesized into a time varying formant filter. This is accomplished by extending the above spectral analysis techniques to produce time varying results. Decomposition of a time-varying formant signals into frames of 10 to 100 milliseconds in length, and utilizing static formant filters within each frame provides highly accurate audio representations of such signals. A preferred embodiment for a time varying formant filter is described in the above-identified cross-referenced patent applications, which illustrate techniques which allow 32 channels of audio data to be filtered in a time-varying manner in real time by a single silicon chip. The aforementioned patent applications teach that two sets of filter coefficients can be loaded by a host microprocessor into the chip and the chip can then interpolate between them. This interpolation is performed at the sample rate and eliminates any audible artifacts from time-varying filters, or from interpolating between different formant shapes. This interpolation is implemented using log-spaced frequency values since log-spaced frequency values produce the most natural transitions between formant spectra.

With a codebook excitation, subtle time variations in the formant further enhance the expressivity of the sound. A time-varying formant can also be used to counter the unnatural static mechanical sound of a looped single-cycle excitation to produce pleasing natural-sounding musical tones. This is particularly advantageous embodiment since the storage of a single excitation cycle requires very little memory.

Control of the formant filter 445 can also provide a deterministic component of expression by varying the filter parameters as a function of control input 452 provided by the user, such as key velocity. In this example a first formant filter would correspond to soft sounds, a second formant filter would correspond to loud sounds, and interpolations between the two filters would correspond to intermediate level sounds. A preferred method of interpolation between formant filters is described in the above-identified cross-referenced patent applications, and are incorporated herein by reference. Interpolating between two formant filters sounds better than summing two recordings of the instrument played at different amplitudes. Summing two instrument recordings played at two different amplitudes typically produces the perception of two instruments playing simulanteously (lack of fusion), rather than a single instrument played at an intermediate amplitude (fusion). The formant filters may be generated by numerical modelling of the instrument, or by sound analysis of signals.

To provide the impression of time varying loudness a single formant filter can be excited by a crossfade between two excitations, one excitation derived from an instrument played softly and the other excitation derived from an instrument played loudly. Alternatively, a note with time varying loudness can be created by a crossfade between two formant filters, one formant filter derived from an instrument played softly and the other formant filter derived from an instrument played loudly. Or the formant filter and the excitation can be simultaneously crossfaded. Each of these techniques provide good fusion results.

With the present invention innovative new instrument sounds can be produced by the combination of the excitations from one instrument and the formants from a different instrument, e.g. the excitation of a trombone with the formants of a violin. Applying a formant from one instrument to the excitation from another will result in a new timbre reminiscent of both original instruments, but identical to neither. Similarly, applying an artifically generated formant to a naturally derived excitation will result in a synthetic timbre with remarkably natural qualities. The same is true of applying a synthetic excitation to a naturally derived time varying formant or interpolating between the formant filters of different instrument families.

Another embodiment of the present invention alters the characteristics of the reproduced instrument by means of an equalization filter. This is easy to implement since the spectrum of the desired equalization is simply multiplied with the spectrum of the original formant filter to produce a new formant spectrum. When the excitation is applied to this new formant, the equalization will have been performed without any additional hardware or processing time.

The foregoing descriptions of specific embodiments of the present invention have been presented for purposes of illustration and description. They are not intended to be exhaustive or to limit the invention to the precise forms disclosed, and it should be understood that many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. An apparatus for synthesis of sounds comprising:

excitation generation means for generation of a long-term prediction coded excitation signal;

means for inverse long-term prediction coding of said long-term prediction coded excitation signal to provide a decoded excitation signal having a pitch;

means for pitch shifting said pitch of said decoded excitation signal to provide a pitch shifted excitation; and means for filtering said pitch shifted excitation with a formant filter.

2. The apparatus of claim 1 wherein said means for pitch shifting includes a means for controlling a shape of an envelope of said pitch shifted excitation.

3. The apparatus of claim 1 wherein said excitation generation means generates said long-term prediction codes excitation signal from codebook entries.

4. The apparatus of claim 3 wherein said codebook entries are looped.

5. The apparatus of claim 3 wherein said formant filter is time-varying.

6. The apparatus of claim 1 wherein said formant filter is time-varying.

7. The apparatus of claim 4 wherein said codebook entries are cross-faded.

8. The apparatus of claim 1 wherein said pitch shifted excitation is crossfaded between a first excitation corresponding to a loud tone and a second excitation corresponding to a soft tone.

9. An apparatus for generating a sound from an input signal having a formant spectrum and an excitation component, comprising:

formant extraction means for extracting a formant filter spectrum from said input signal;

filter spectrum inversion means for inverting said formant filter spectrum to produce an inverted formant filter;

excitation extraction means for extracting said excitation component from said input signal by applying said inverted formant filter to said input signal to produce an extracted excitation component;

excitation modification means for modifying said extracted excitation component to produce a modified excitation component; and synthesis means for using said modified excitation component and said formant filter spectrum to synthesize said sound.

10. The apparatus of claim 9 wherein said excitation modification means comprises means for pitch shifting.

11. The apparatus of claim 9 further comprising formant modification means for modifying said formant filter spectrum to produce a modified formant filter spectrum, said synthesis means using said modified formant filter spectrum to synthesize said sound.

12. The apparatus of claim 9 wherein said sound is a musical tone.

13. A method for generating a sound from an input signal having a formant spectrum and an excitation component, comprising the steps of:

extracting a formant filter spectrum from said input signal;

inverting said formant filter spectrum to produce an inverted formant filter;

extracting said excitation component from said input signal by applying said inverted formant filter to said input signal to produce an extracted excitation component;

modifying said extracted excitation component to produce a modified excitation component; and using said modified excitation component and said formant filter spectrum to synthesize said sound.

14. The method of claim 13 wherein said step of modifying said extracted excitation component comprises pitch shifting.

15. The method of claim 13 further comprising the step of modifying said formant filter spectrum to produce a modified formant filter spectrum, said using step also using said modified formant filter spectrum to synthesize said sound.

16. The method of claim 13 wherein said sound is a musical tone.

17. A sound synthesizer apparatus comprising:

a memory storing formant filter coefficients and an excitation component, said format filter coefficients having been derived by extracting a formant filter spectrum from an input signal, said excitation component having been derived by inverting said formant filter spectrum to produce an inverted formant filter and extracting said excitation component from said input signal by applying said inverted formant filter to said input signal;

excitation modification means for modifying said excitation component to produce a modified excitation component; and synthesis means for using said modified excitation component and said formant filter spectrum to synthesize a sound.

18. The apparatus of claim 17 wherein said excitation modification means comprises means for pitch shifting.

19. The apparatus of claim 17 further comprising formant modification means for modifying said formant filter spectrum to produce a modified formant filter spectrum, said synthesis means using said modified formant filter spectrum to synthesize said sound.

20. The apparatus of claim 17 wherein said sound is a musical tone.

* * * * *